(12) United States Patent
Golwalkar et al.

(10) Patent No.: US 7,476,037 B2
(45) Date of Patent: Jan. 13, 2009

(54) APPARATUS FOR COUPLING A FIBER OPTIC CABLE TO AN OPTOELECTRONIC DEVICE, A SYSTEM INCLUDING THE APPARATUS, AND A METHOD OF FORMING THE SAME

(75) Inventors: Suresh Golwalkar, Phoenix, AZ (US); Noah Davis, Los Angeles, CA (US); John Burns, Harbor City, CA (US); Kannan Raj, Chandler, AZ (US); Phil McClay, Fountain Hills, AZ (US); Wuchun Chou, Chandler, AZ (US); Jonathan McFarland, Phoenix, AZ (US)

(73) Assignee: Zarlink Semiconductor, Inc., Ottawa, Ontario (CA)

( * ) Notice: Subject to any disclaimer, the term of this patent is extended or adjusted under 35 U.S.C. 154(b) by 0 days.

(21) Appl. No.: 11/461,656

(22) Filed: Aug. 1, 2006

(65) Prior Publication Data

US 2007/0053637 A1   Mar. 8, 2007

Related U.S. Application Data

(63) Continuation of application No. 09/911,918, filed on Jul. 24, 2001, now Pat. No. 7,101,091.

(60) Provisional application No. 60/276,296, filed on Mar. 16, 2001, provisional application No. 60/270,387, filed on Feb. 21, 2001.

(51) Int. Cl.
*G02B 6/36* (2006.01)
*H01R 33/945* (2006.01)
*B29D 11/00* (2006.01)

(52) U.S. Cl. .............................. 385/89; 385/88; 385/92; 439/577; 264/1.24

(58) Field of Classification Search .................. 385/76, 385/77, 78, 80, 88, 89, 92, 93, 94, 114, 14, 385/139, 101; 439/577; 250/227.11; 264/1.1, 264/1.24, 1.28

See application file for complete search history.

(56) References Cited

U.S. PATENT DOCUMENTS

| | | | | |
|---|---|---|---|---|
| 4,732,446 A * | 3/1988 | Gipson et al. | ................. | 385/24 |
| 4,844,582 A * | 7/1989 | Giannini | ....................... | 385/57 |
| 5,242,315 A * | 9/1993 | O'Dea | ....................... | 439/577 |
| 5,500,914 A * | 3/1996 | Foley et al. | ................... | 385/77 |
| 5,781,682 A * | 7/1998 | Cohen et al. | .................. | 385/89 |
| 6,201,704 B1 * | 3/2001 | Poplawski et al. | .......... | 361/753 |
| 7,101,091 B2 * | 9/2006 | Golwalkar et al. | ............ | 385/89 |

* cited by examiner

*Primary Examiner*—Brian M Healy
(74) *Attorney, Agent, or Firm*—The Noblitt Group, PLLC

(57) ABSTRACT

A device for forming an optical connection between an optoelectronic device and an optical fiber and for forming an electrical connection between the optoelectronic device and a substrate, a system including the device and materials, and methods of forming the device and system are disclosed. The device for forming an optical connection includes a—light transmission medium and electrical connectors, which are at least partially encapsulated. In addition, the device includes guide grooves configured to receive guide pins from a fiber ribbon connector, such that when the fiber ribbon connector is attached to the device, fibers of the ribbon align with the optoelectronic device via the light transmission medium.

59 Claims, 12 Drawing Sheets

APPARATUS FOR COUPLING A FIBER OPTIC CABLE TO AN OPTOELECTRONIC DEVICE, A SYSTEM INCLUDING THE APPARATUS, AND A METHOD OF FORMING THE SAME

RELATED APPLICATIONS

This application is a continuation of U.S. patent application Ser. No. 09/911,918, now U.S. Pat. No. 7,101,091, filed Jul. 24, 2001 in the name of Golwalkar, et al., which claims the benefit of provisional application Ser. No. 60/270,387, entitled APPARATUS FOR COUPLING A FIBER OPTIC CABLE TO A MICROELECTRONIC DEVICE, A SYSTEM STRUCTURE INCLUDING THE APPARATUS, AND A METHOD OF FORMING THE SAME in the name of Golwalker et al., filed Feb. 21, 2001 and provisional application Ser. No. 60/276,296, entitled APPARATUS FOR COUPLING A FIBER OPTIC CABLE TO A MICROELECTRONIC DEVICE USING A FUSED FIBER FACEPLATE, A SYSTEM INCLUDING THE APPARATUS, AND A METHOD OF FORMING THE SAME, in the name of Davis et al., filed Mar. 16, 2001.

FIELD OF THE INVENTION

The present invention generally relates to optoelectronic devices. More particularly, the invention relates to apparatus for coupling optical fibers to optoelectronic devices, systems including the apparatus and optoelectronic components, and methods of forming the apparatus and system.

BACKGROUND OF THE INVENTION

Fiber optic systems are often used to transmit information such as voice band and data across a network. Such systems include a light transmitting device (e.g., a laser) coupled to a first end of a fiber cable and a light receiving device (e.g., a photodetector) coupled to the other end of the cable; the light emitting and light receiving devices are collectively referred to as optoelectronic devices. In addition, the fiber optic system may also include an optical coupler to increase the efficiency of light transfer between the optoelectronic device and the fiber cable.

Various prior-art techniques and couplers have been developed to optically connect the fiber cable to an optoelectronic device. For example, couplers, including lenses to focus light emitted from a laser toward a fiber cable or from the cable toward a detector have been developed. Such systems generally require—precise alignment of the optoelectronic device, the coupler, and the cable to achieve high-efficiency light transfer. The precision alignment techniques are typically manual, time consuming and expensive. Thus, improved optical couplers, which do not require or require less manual alignment between various components of the fiber optic system are desired.

An additional problem associated with traditional optical couplers is that the couplers typically do not account for electrical connections between the optoelectric device and substrate such as a printed circuit board. Instead, the electrical connections are generally formed by attaching the optoelectric device to a flexible substrate, which is in turn attached to the printed circuit board. With the prior art coupler, the flexible substrate allows the optoelectronic device to be manually aligned with the coupler to increase transmission efficiency. However, the use of the flexible substrate may add undesired cost to and require additional space for the fiber optic system.

Accordingly, improved optical couplers that facilitate electrical connection between an optoelectric device and a substrate are desired.

SUMMARY OF THE INVENTION

The present invention provides an improved connector or coupler for linking optical fibers to microelectronic devices, a system including the coupler, and a method of forming the coupler and system. The way in which the present invention addresses various drawbacks of the now-known fiber optical couplers and connector systems will be addressed in greater detail below. However, in general, the fiber optic cable connector and system of the present invention allow for relatively easy and inexpensive coupling of an optoelectronic device to an optical fiber.

In accordance with one embodiment of the invention, an optical coupler includes a light transmission path and at least one alignment groove configured to facilitate alignment between and coupling of a fiber cable ribbon and the optical coupler. In accordance with one aspect of this embodiment, the coupler includes electrical connectors that provide a conductive path between an optoelectronic device attached to the coupler and a substrate such as a printed circuit board. In accordance with a further aspect of this embodiment, the light transmission path is formed of a bundle of optical fibers, wherein the core diameter of each of the fibers is less than the core diameter of the optical fibers of the fiber ribbon. In accordance with a further aspect, the coupler includes an encapsulant surrounding at least a portion of the grooves, the transmission path, and the connectors.

In accordance with a further embodiment of the invention, an optical coupler includes a microelectronic substrate, including multiple layers of conductive paths or traces formed therein, at least one alignment groove or sleeve, an optical path, and an encapsulant.

In accordance with another embodiment of the invention, an optoelectronic system includes an optical coupler, an optoelectronic device, and an optical fiber. The optoelectronic device may be a light emitting (e.g., a laser) or light receiving (e.g., a photodiode) device. In accordance with one aspect of this embodiment, the optical coupler includes electrical connectors and at least one of the optoelectronic devices is electrically coupled to the electrical connectors. In accordance with a further aspect of the invention, the optical coupler includes guides, and the optical fiber forms part of a fiber ribbon connector that includes guide pins configured to be received by the guides of the optical coupler, such that when the fiber ribbon is attached to the optical coupler, the transmission path of the optical coupler is aligned with the optical fiber(s) of the fiber ribbon. In accordance with yet a further aspect of this embodiment, the system includes a gel compound attached to the optoelectronic device and the optical coupler between the optoelectronic device and the optical coupler and/or to increase light transfer between the optical coupler and the optoelectronic device.

In accordance with another embodiment of the invention, a method of forming an optical coupler includes forming electrical connectors from a plate of conductive material, forming guides, attaching an optical transmission medium to a portion of the electrical connectors, encapsulating the transmission medium and at least a portion of the electrical connectors, and polishing at least one surface of the transmission medium. In accordance with one aspect of this embodiment, the guides are formed from the plate of conductive material.

In accordance with yet another embodiment of the invention, a method of forming an optical coupler includes forming a microelectronic substrate having electrical interconnections, attaching an optical transmission medium and guides to the microelectronic substrate, encapsulating the guides and the transmission medium, and polishing at least one surface of the transmission medium.

In accordance with another embodiment of the invention, a method of forming an optical coupler includes forming electrical connectors from a plate of conductive material, attaching an optical transmission medium, which includes optical elements configured to collimate and refocus light, and encapsulating at least a portion of the transmission medium. In accordance with one aspect of this embodiment, the optical elements include of a pair of micro-optical relay lens arrays which are diffractive, refractive or holographic lenses.

In accordance with a further embodiment of the invention, a method of forming an optical interconnect system includes forming an optical coupler, attaching an optoelectronic device to the coupler, and attaching a fiber optic ribbon to the coupler. In accordance with one aspect of this embodiment, the fiber ribbon is removeably attached to the coupler. In accordance with a further aspect of this embodiment, the optoelectronic component is attached to the coupler using solder bump technology, surface mount technology, anisotropic conductive film (ACF), and/or electrical adhesive or metal-metal contact technology.

In accordance with another embodiment of the invention, a method of forming an optical coupler includes forming electrical connectors from a plate of conductive material, attaching an optical transmission medium that is transparent in the region of the radiation spectrum including the visible and the visible to mid infrared wavelengths, and encapsulating at least a portion of the transmission medium.

In accordance with one or more of the embodiments of the present invention, the optical transmission path is coated with anti-reflection material to minimize reflection losses as light travels through the path.

BRIEF DESCRIPTION OF THE DRAWINGS

The present invention is illustrated by way of example and not limitation in the accompanying figures, in which like references indicate similar elements, and in which.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF EXEMPLARY EMBODIMENTS

Figure 1:
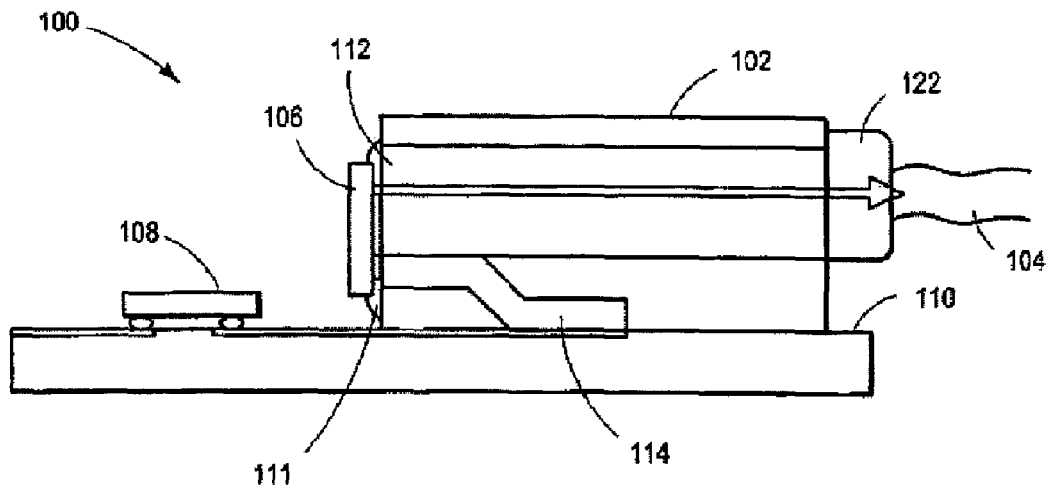
FIG. 1 is a cross-sectional illustration of a portion of an optical interconnect system in accordance with the present invention.

FIG. 1 illustrates a cross-sectional side view of an optical interconnect system 100 in accordance with the present invention. System 100 includes an optical coupler 102, a fiber ribbon 104, and an optoelectronic device 106. System 100 may also include a driver 108 to drive optoelectronic device 106, a substrate 110 such as a printed circuit board or the like, and a gel 111 to facilitate efficient light transfer between device 103 and coupler 102 and to protect a portion of device 102 and coupler 102 from the environment. Although system 100 is illustrated as including a fiber ribbon 104, a system in accordance with the present invention may include a coupler coupled to an optoelectronic device on one side and any suitable waveguide, optical device, photonics devices, or the like on the other side. In accordance with one embodiment of the invention, a transceiver includes a portion of system 100. In particular, the transceiver includes optoelectronic device 106 and coupler 102.

Figure 2:
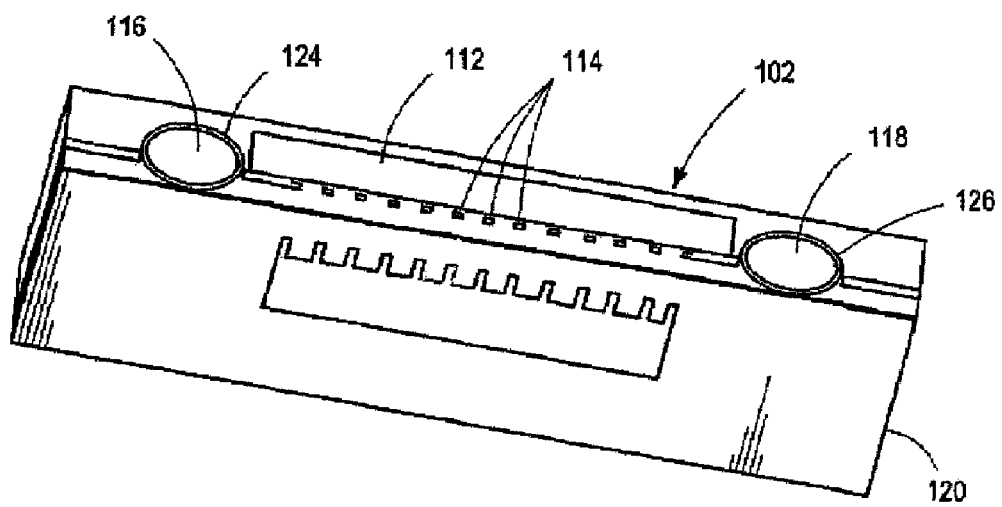
FIG. 2 is a bottom perspective view of an optical coupler in accordance with one embodiment of the present invention.

Coupler 102, illustrated in perspective view in FIG. 2, is configured to facilitate forming an optical connection between an optical fiber of ribbon 104 and optoelectronic device 106, without requiring extensive, labor intensive adjustment of optoelectronic component 106 or fiber ribbon 104. In other words, coupler 102 is designed to provide a "self-aligned" optical path between optoelectronic component 106 and fiber ribbon 104. In addition, in accordance with various embodiments of the invention, coupler 102 also provides an electrical connection between optoelectronic component 106 and a substrate 110. In accordance with the illustrated embodiment, coupler 102 includes an optical medium 112, electrical connectors 114, guides 116 and 118, and an encapsulant 120.

Optical transmission medium 112 may be formed of any material that is transparent in the light wavelengths transferred between device 106 and fibers of ribbon 104. For example, medium 112 may be formed of a glass block, a fiber ribbon, a fiber tape, a holographic optical element, a cavity formed within encapsulant 120, a ferrule or any other suitable waveguide material or optical bus. In accordance with one embodiment of the invention, medium 112 includes a bundle of fused glass fibers, wherein each of the fibers has a core diameter that is less than the core diameter of a fiber of ribbon 104. For example, when the fibers of ribbon 104 have a core diameter of about 50 micrometers ($\mu m$), the diameter of the fused fibers of medium 112 are preferably about 4 $\mu m$ to about 10 $\mu m$. In accordance with another embodiment of the invention, medium 112 comprises optical elements configured to collimate and refocus light. Such optical elements are well suited for forming multiplexing and demultiplexing couplers.

Forming the transmission medium of fused fibers is advantageous because each fiber transmits light directly from one end of the fiber to the other, without dispersion of light. Thus, multiple optoelectronic devices 106 can be coupled to a single fused-fiber transmission medium and transmit or receive light to or from the medium, without interference from the light transmission of neighboring optoelectronic devices or fibers of ribbon 104. Furthermore, because the diameter of the individual fused fibers is less than the core diameter of a fiber of ribbon 104, it is relatively easy to assemble system 100, such that an optical path between optoelectronic device 106 and the fiber of ribbon 104 is in alignment. For example, such a scheme enables the coupling of light between optoelectronic devices and receivers or detectors.

The dimensions of transmission medium 112 may vary from application to application and depend on such factors as the configuration of the optoelectronic device, the composition of the transmission medium and the like. However, in accordance with one embodiment of the invention, medium 112 includes fused fibers and has overall dimensions of about 3.1 mm wide, about 450 micron high, and about 2 mm long (along the length of the fused fibers).

When used, electrical connectors 114 provide a conductive path between optoelectronic device 106 and substrate 110 to form a conductive path between, for example, driver 108 and optoelectronic device 106. As explained in greater detail below, connectors 114 may be formed from a sheet or plate of conductive material by patterning and forming or bending the conductive material, from wire bonds, or from a microelectronic substrate having conductive layers formed therein, to eventually form a conductive path with an effective ninety degree electrical bend. The effective ninety degree electrical bend is advantageous because several optoelectronic devices such as vertical cavity surface emitting lasers (VCSELs) emit light in the direction of the surface upon which electrical contacts of the device are formed. With several prior art optoelectronic coupler systems, the VCSEL is bonded directly to the substrate and the light is bent ninety degrees using relatively complicated and expensive optical couplers.

Electrical connectors are generally configured such that when optoelectronic device 106 is coupled to coupler 102, the light output or input section of device 106 is aligned with medium 112 and to a desired fiber of ribbon 104. Therefore, the spacing and dimensions of coupler 114 is often determined by the optoelectronic devices attached to the connectors. In accordance with one embodiment of the invention, connectors 114 are formed of a conductive metal plate (e.g., copper) having a thickness of about 70 μm and are spaced about 125 μm apart. Couplers 114 may also include additional material such as gold to facilitate bonding to optoelectronic device 106 and solder material to facilitate bonding to substrate 110.

Guides 116 and 118 are generally configured to facilitate alignment between coupler 102 and fiber ribbon 104. In particular, guides 116 and 118 are designed to receive pins or protrusions from ribbon 104, such that the fibers of ribbon 104 align with medium 112 and to optoelectronic devices 106. In accordance with one embodiment of the invention, ribbon 104 includes guide pins as are typically found on MT series of fiber connectors 122, and guides 116 and 118 are formed of tubes 124 and 126, which eventually form cavity regions within encapsulant 120. Tubes 124 and 126 may be formed of any suitable material. For example, tubes 124 and 126 may be formed of molded plastic or conductive material used to form couplers 114.

Encapsulant 120 is generally configured to provide insulation between couplers or connectors 114 and to provide a protective environment around medium 112 and at least a portion of connectors 114. Exemplary encapsulant 120 materials include transfer mold compound, ceramic material, and other suitable materials. In accordance with one embodiment of the invention, encapsulant 120 is formed of silica-filled epoxy. In accordance with another embodiment, encapsulant 120 includes Glob Top.

Gel 111 may include any suitable optically transparent material. In accordance with one embodiment of the invention, gel 111 includes a clear organic material having an index of refraction that is "index matched" to the index of refraction of transmission medium 112 and to a portion of the optoelectronic device. In this context, "indexed matched" means that the index of refraction of material 111 is the same as the index of refraction of either transmission medium 112 or a portion of the optoelectronic device, or the index refraction of gel 111 is between the index of refraction of the transmission medium 112 and a portion of the optoelectronic device.

Optoelectronic or photonics device 106 may include any suitable light emitting or light detecting device. For example, device 106 may include light emitting device such as a light emitting diode, an edge emitting laser, a VCSEL, a distributed feedback laser, a distributed Bragg reflective light source, or the like. The light emitting device may emit light of one or more wavelengths. If device 106 is a light detecting device, device 106 may include a photo detector such as reversed-biased on junction diodes, p-i-n diode, metal-semiconductor-metal (MSM) detector, a resonant cavity enhanced detector, a liquid crystal display, or the like. Devices 106 may be a discrete component or assembled in a one dimensional (1-D) or two-dimensional (2-D) array. Furthermore, device 106 may be configured to emit or detect light of any desired wavelength; however, device 106 is preferably designed to emit or detect light of one or more wavelengths in the mid infrared to and including the visible radiation spectrum.

Substrate 110 may include any suitable material. Exemplary substrate materials include FR-4 printed circuit board materials, ceramic materials, flexible substrates, silicon, and the like.

Figure 3:
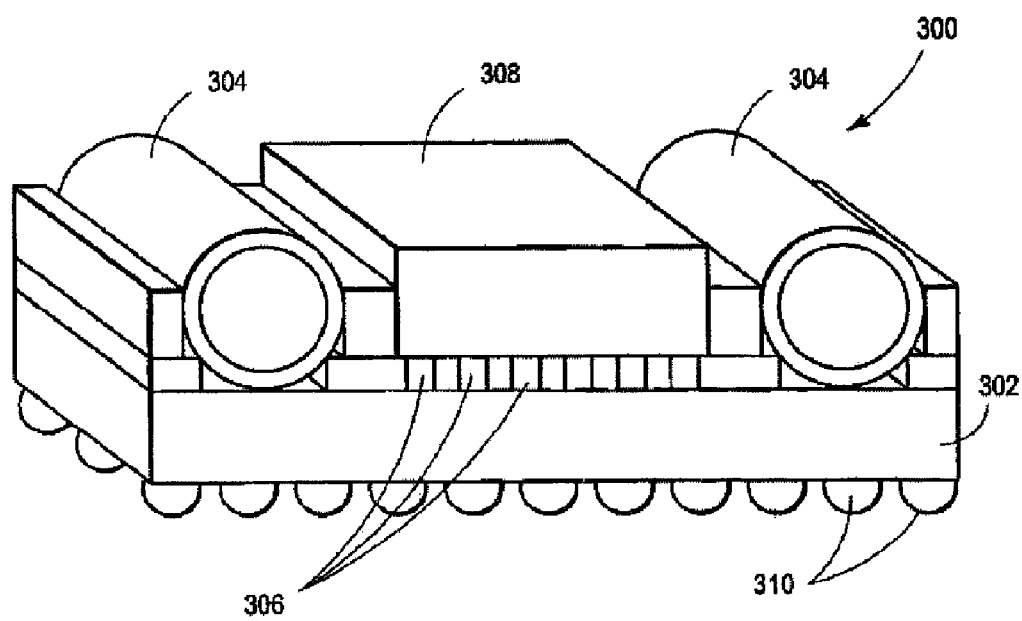
FIGS. 3-5 are cross-sectional illustrations of a portion of an optical coupler in connection with another embodiment of the invention.
Figure 4:
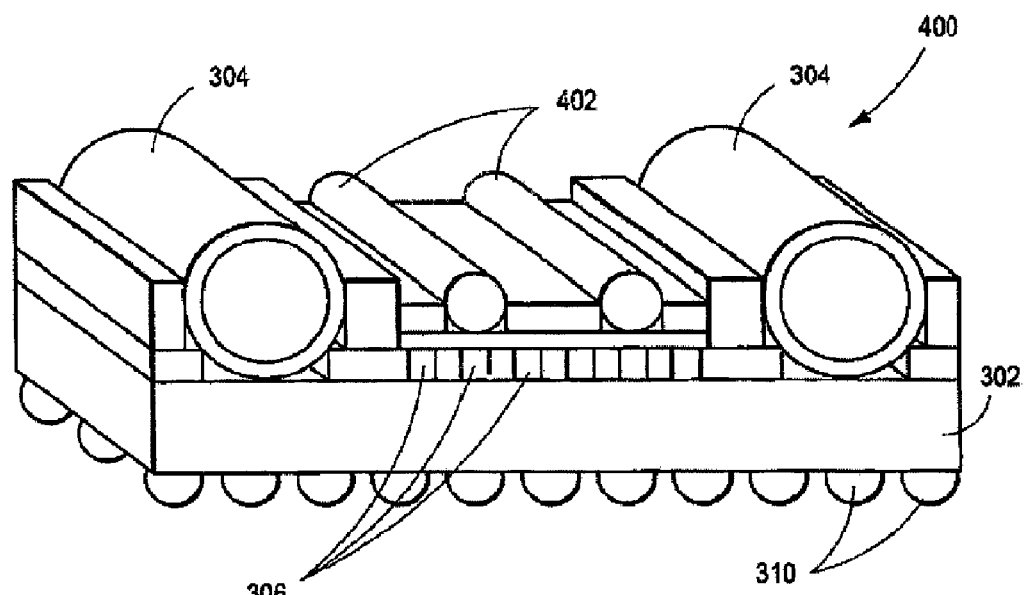
Figure 5:
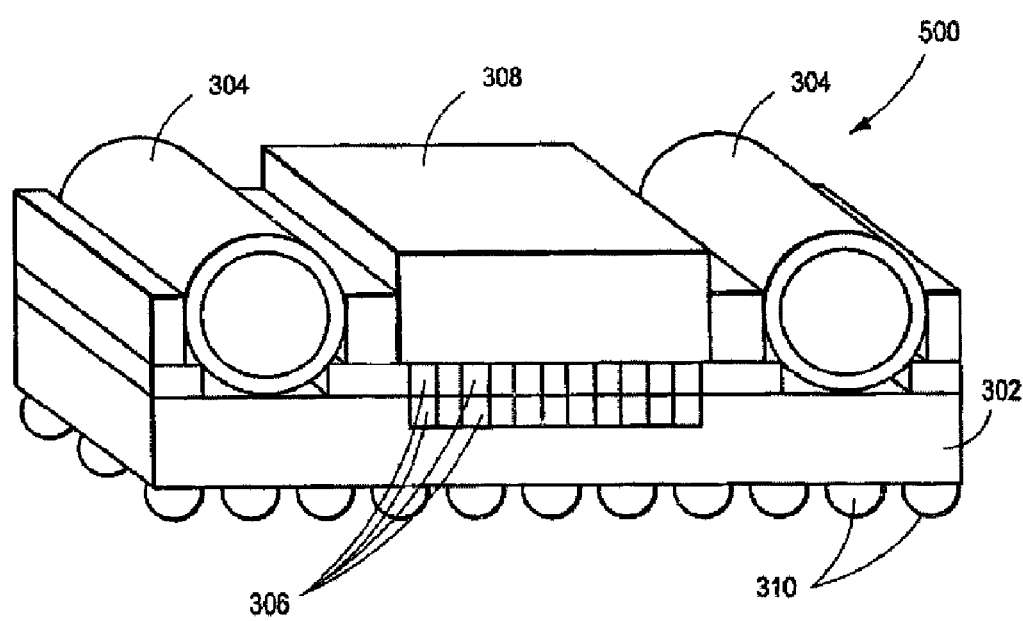

FIGS. 3-5 illustrate cross-sectional views of connectors 300, 400, and 500 in accordance with additional embodiments of the invention. Any of coupler 300-500 may suitably replace coupler 102 of system 100. As explained in greater detail below, each of couplers 300, 400, and 500 includes a microelectronic substrate 302 to form a conductive path between an optoelectronic component 106 and a substrate 110, alignment grooves 304, a transmission medium as described above, and an encapsulant (not illustrated in FIGS. 3-5).

Microelectronic substrate 302 includes conductive plugs or filled vias 304 and may additionally include conductive traces, which interconnect various portions of substrate 302. Substrate 302 may include only a single layer of conductive plugs 306, as illustrated in FIG. 3, or substrate 302 may include multiple rows of conductive plugs as illustrated in FIG. 5. Use of multiple conductive plugs on a surface of the coupler may be advantageous because it provides greater surface area to which optoelectronic devices can be attached. Thus, multiple, stacked vias can be used to provide flexibility of use of substrate 302, such that a variety of optoelectronic devices, having a variety of electrode spacing, can be attached to substrate 302. Alternatively, substrate 302 may only include conductive traces on a surface to which device 106 is attached. In this case, electrodes of device 106 are coupled directly to the conductive traces, which are in turn coupled to the substrate using distal conductive plugs.

In accordance with one embodiment of the invention, substrate 302 includes ceramic material having metallic (e.g., copper) traces and conductive plugs formed therein. However, other suitable insulating materials such as low dielectric constant organic materials and conducting material such as tungsten paste may be used to form substrate 302.

Grooves 304 and the transmission medium may include any of the materials described above in connection with FIGS. 1 and 2. For example, transmission medium 308 may include fused fibers as illustrated in FIGS. 3 and 5, individual fibers 402 as illustrated in FIG. 4, a glass block, a hologram, or the like.

Coupler 300, 400, and 500 may also include solder bumps to facilitate electrical and mechanical attachment of couplers 300, 400, and 500 to a substrate. For example, lead-tin alloy bumps may be formed on a bottom surface of substrate 302 using known solder bump technology.

Figure 6:
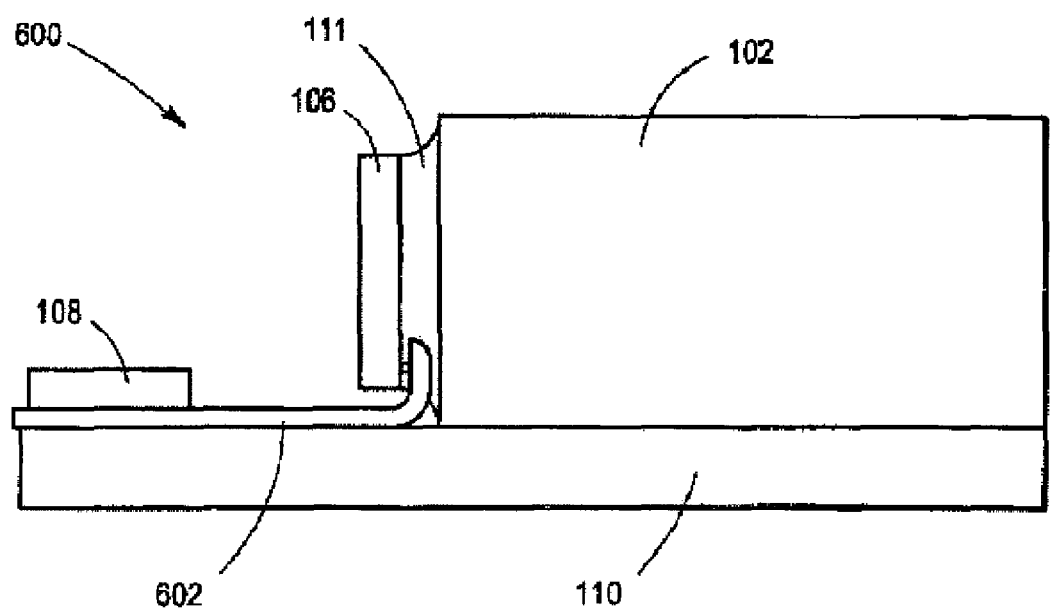
FIG. 6 is a cross-sectional illustration of an optical interconnect system in accordance with another embodiment of the invention.

FIG. 6 illustrates a system 600 in accordance with yet another embodiment of the invention. System 600 is similar to system 100, except system 600 uses a flexible substrate 602 (e.g., flex tape) to form an electrical contact between optoelectronic device 108 and another device such as driver 108. Although illustrated as having flexible substrate bent underneath device 106, substrate 602 may suitably bend in another direction, such that, e.g., substrate 602 lies underneath coupler 102.

Figure 7:
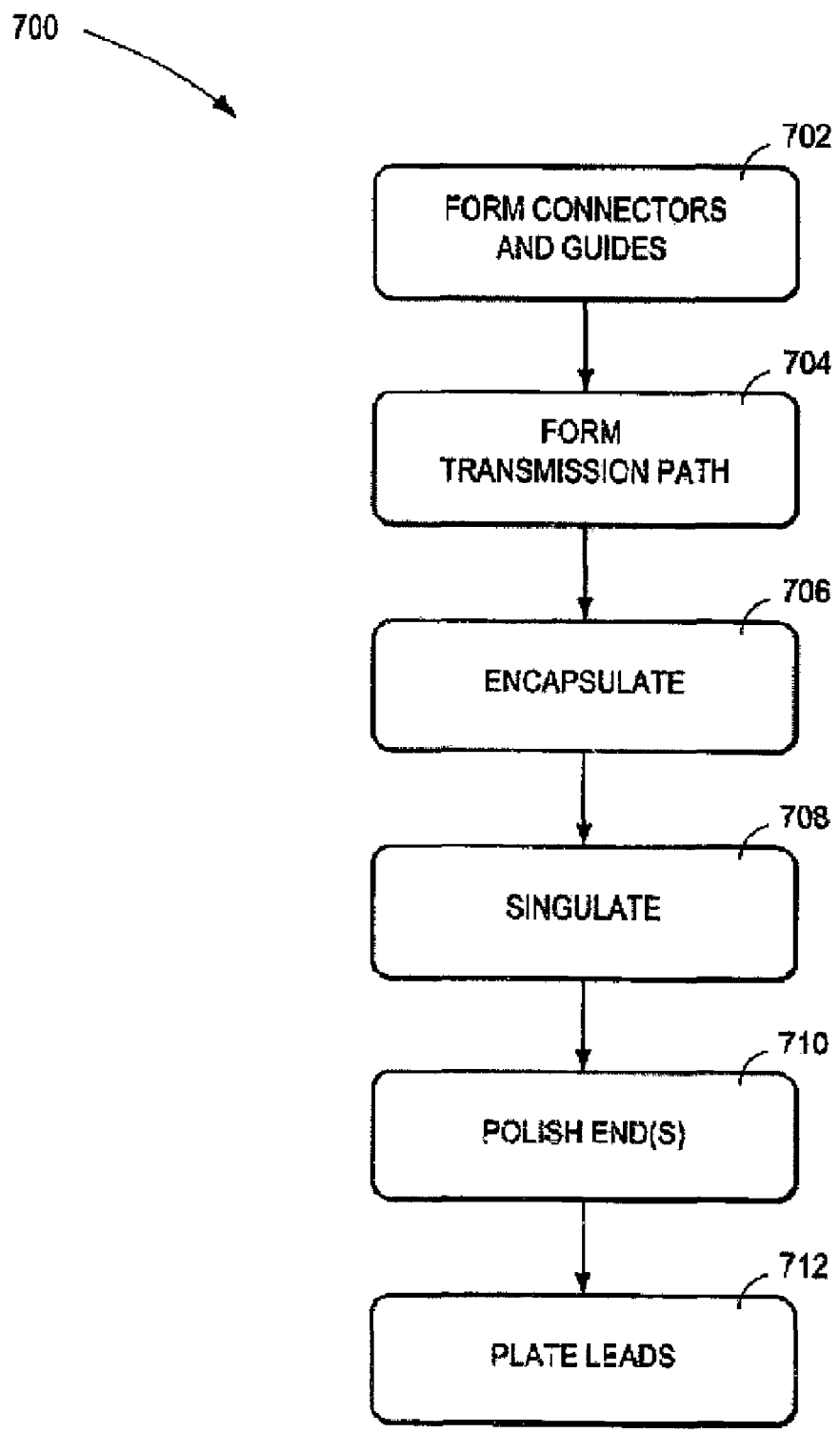
FIG. 7 is a schematic illustration of a process for forming an optical coupler in accordance with the present invention.

FIG. 7 illustrates a method 700 for forming a coupler, such as coupler 102, in accordance with the present invention. Method 700 includes the steps of forming electrical connectors and guides 702, forming transmission path 704, encapsulating the transmission path and at least a portion of the connectors 706, singulating the couplers 708, polishing the ends of the transmission medium (optional) 710, and plating the ends of the leads with material 712 to facilitate coupling of the coupler to an optoelectronic device and/or a substrate. A method of forming a system in accordance with the invention additionally includes the steps of attaching an optoelectronics device to a coupler and placing index matching gel between the optoelectronic device and a transmission path of the coupler.

Figure 8:
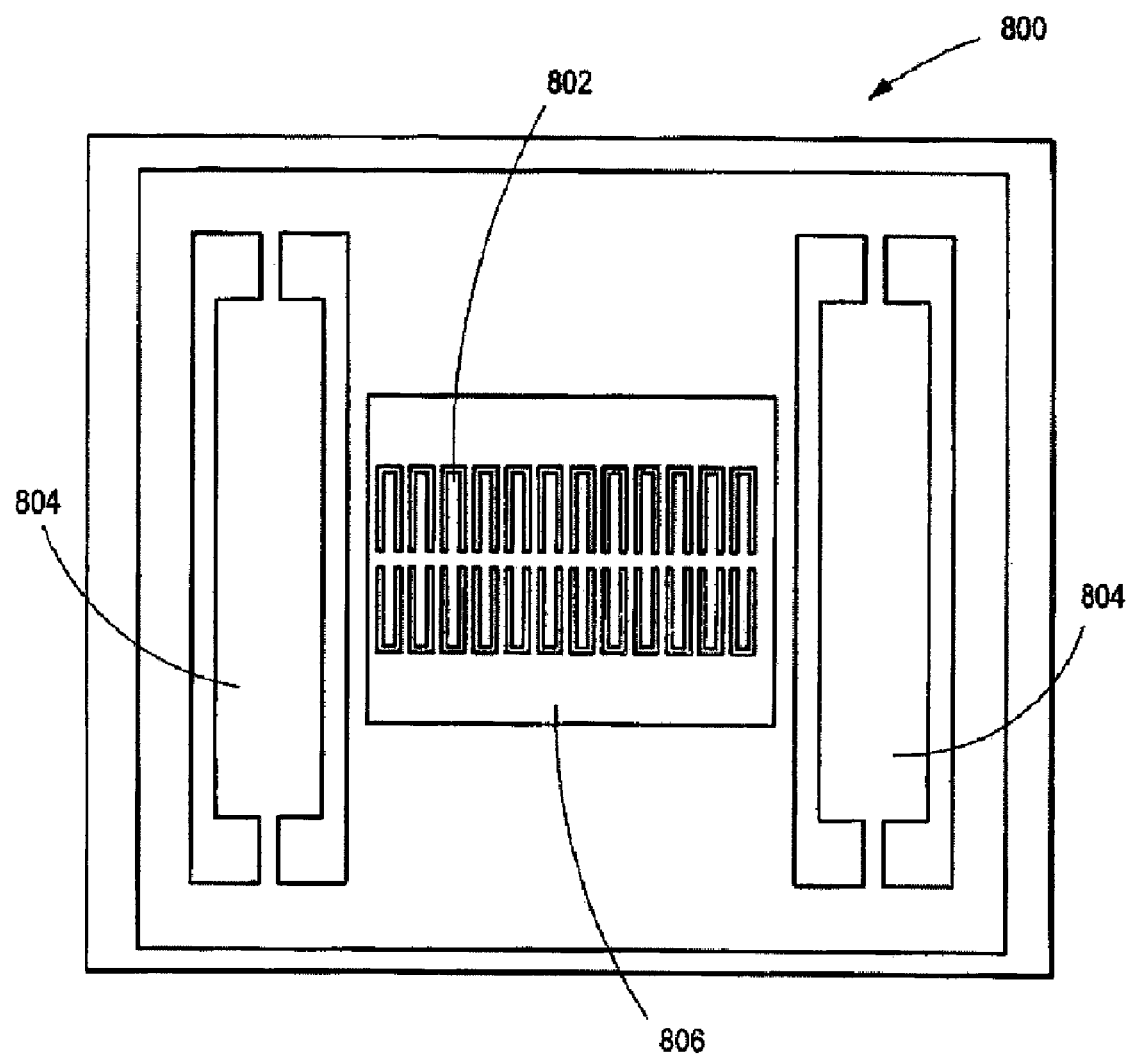
FIG. 8 is a top view illustration of a conductive plate used to form connectors in accordance with the present invention.

In accordance with one embodiment of the invention, step 702 includes forming electrical connectors (e.g., connectors 114) and guides (e.g., guides 116 and 118) from a plate or sheet of conductive material. FIG. 8 illustrates a top view of a patterned sheet of conductive material 800, such as copper, having a thickness of about 70 μm suitable for forming connectors in accordance with the present invention. The sheet may be patterned using, for example, photoresist and etched, or alternatively, be cut to form the desired pattern. In accordance with the illustrated embodiment, patterned sheet 800 includes lead portions 802, which can be used to form electrical connections between the optoelectronic device and a substrate and sleeve portions 804, which can be bent and shaped to form groove spacers 124, illustrated in FIG. 2. Additionally, plate 800 may be etched or cut to form a common ground plane region 806.

Figure 9:
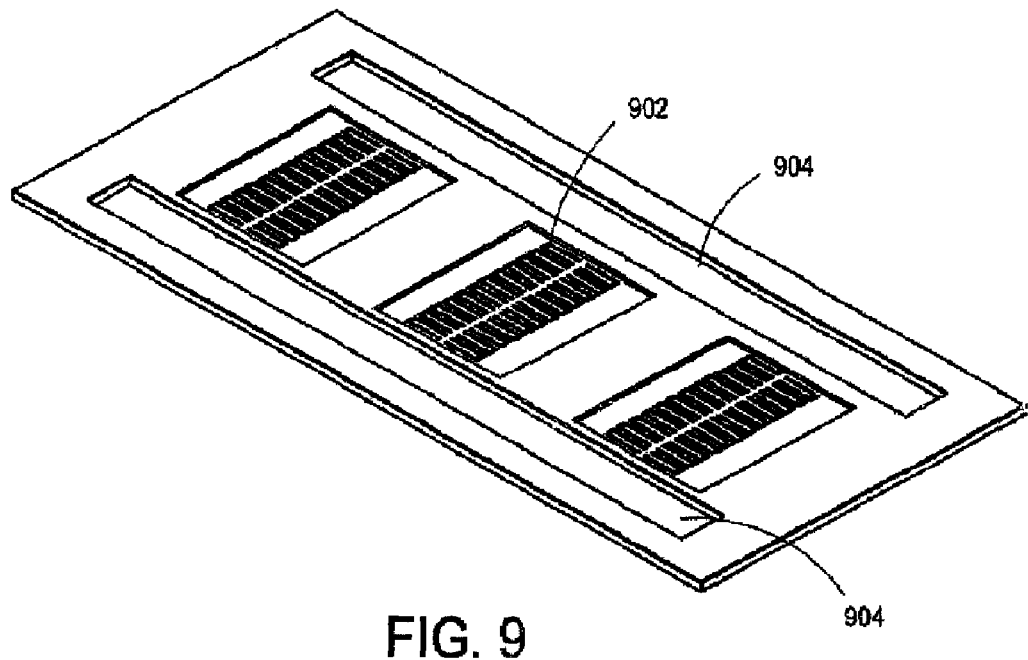
FIGS. 9-10 are perspective illustrations of a portion of a conductive plate used to form connectors in accordance with another embodiment of the invention.

FIG. 9 illustrates another conductive plate 900 in accordance with an alternate embodiment of the invention, plate 900. Plate 900 is similar to plate 800, except that plate 900 does not include regions to form groove spacers. Instead, plate 900 includes leads 902 and groove regions 904, onto which groove sleeves will be attached.

Figure 10:
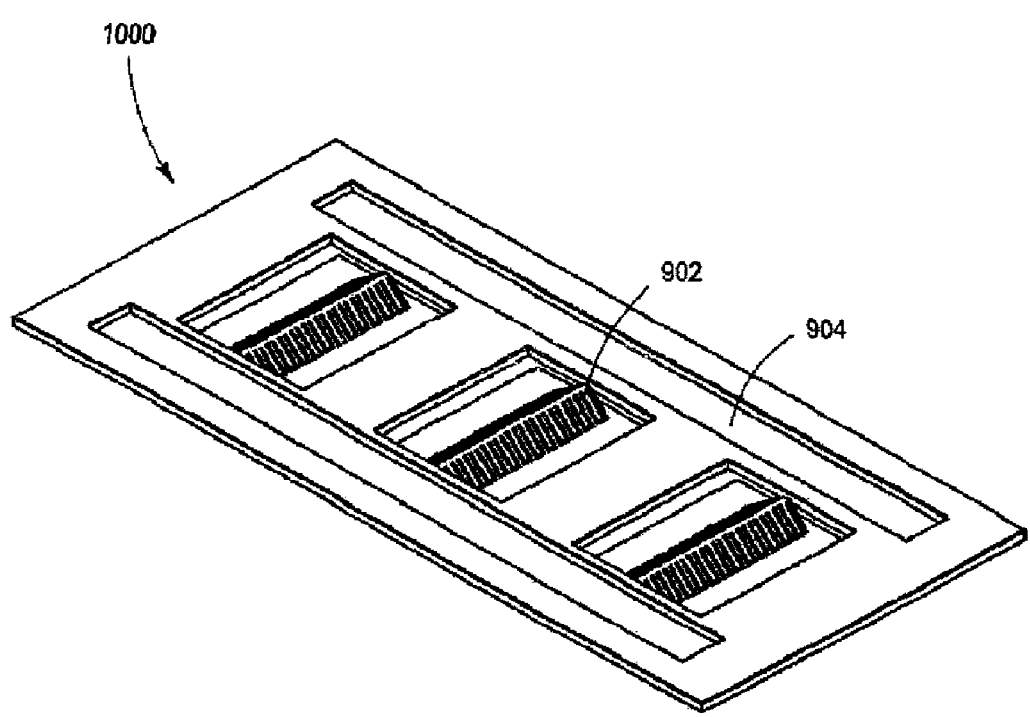
Figure 11:
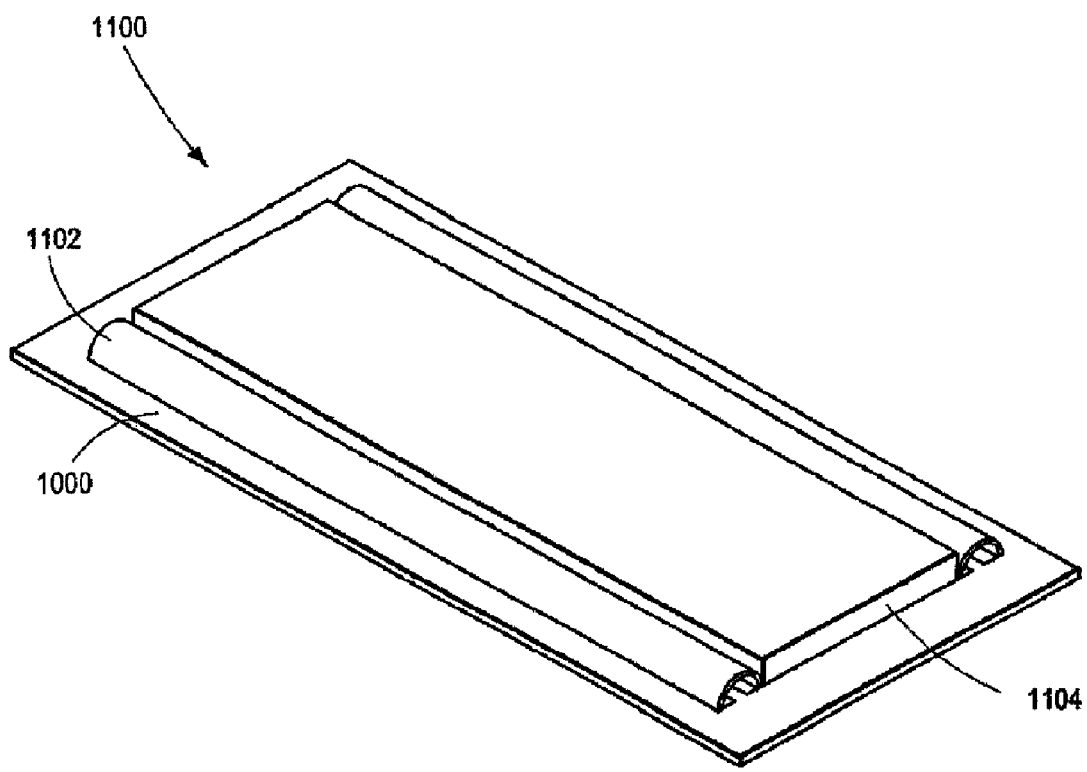
FIGS. 11-13 illustrate portions of an optical coupler during manufacture of the coupler in accordance with an exemplary embodiment of the invention.

After plate 900 is patterned, the leads are bent to form structure 1000 illustrated in FIG. 10. The leads may be bent in any desired fashion, but are preferably bent such that the leads form an electrical connection with an effective ninety degree turn. In accordance with one aspect of this embodiment, the effective ninety degree turn is obtained by forming two 135° bends in the leads, as best illustrated in FIG. 1. Structure 800 may similarly be formed to bend leads 802 and form the groove sleeves.

Once the leads are bent and the groove sleeves 1102 are formed and/or attached to the frame, transmission medium or spacer 1104 is attached to the frame of conductive material to form structure 1100, as illustrated in FIG. 1. The transmission medium may be attached to frame 1000 in any suitable manner—for example, an epoxy or other suitable glue may be used to attach the medium or a spacer for the medium to frame 1000.

Figure 12:
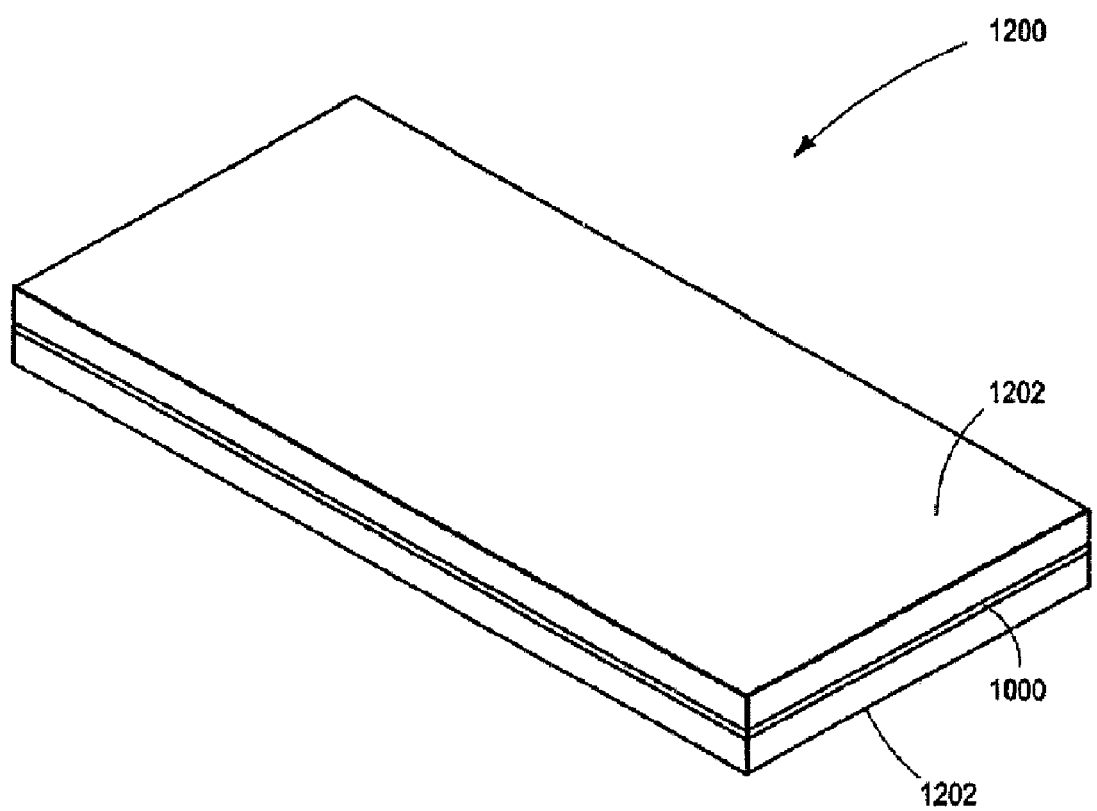

Next, during step 706, an encapsulant material 1202 is formed over structure 1100 to form structure 1200, illustrated in FIG. 12. In accordance with a preferred method of forming an optical coupler of the present invention, encapsulant 1202 includes an epoxy resin compound applied using transfer mold technology. However, other suitable encapsulating techniques may also be used in accordance with the present invention.

Figure 13:
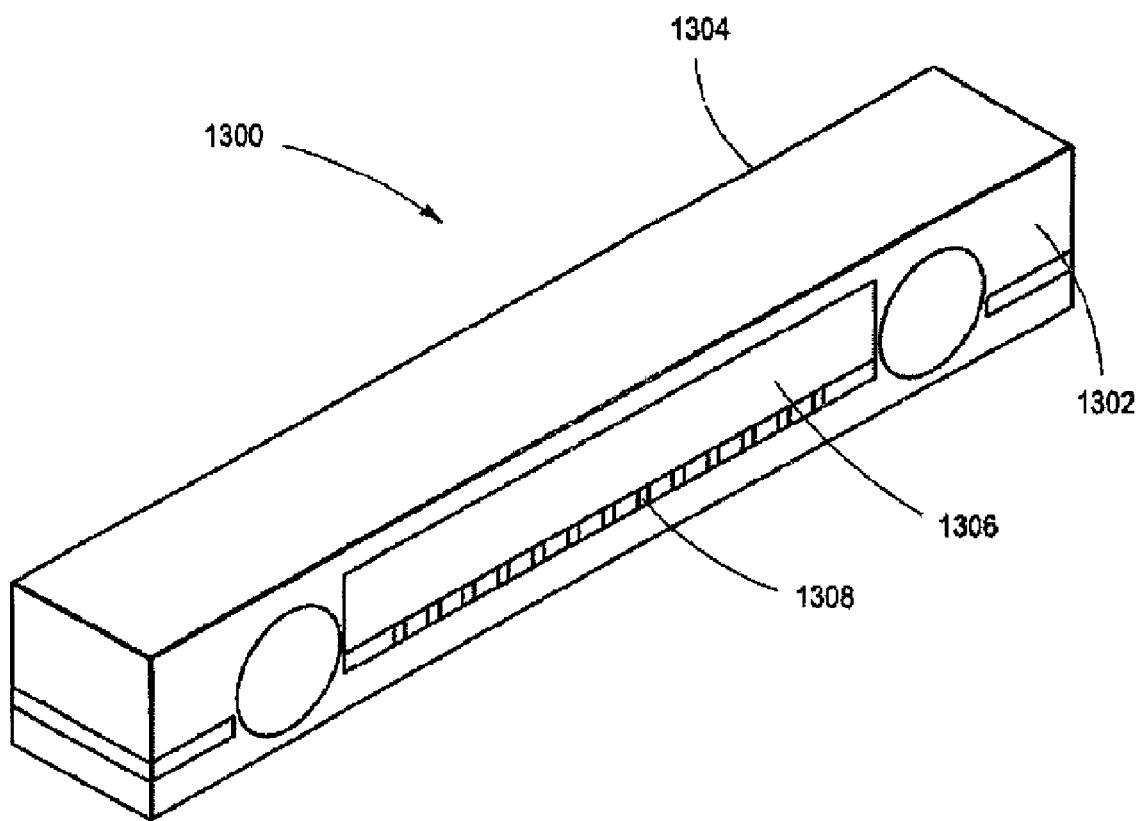
Figure 14:
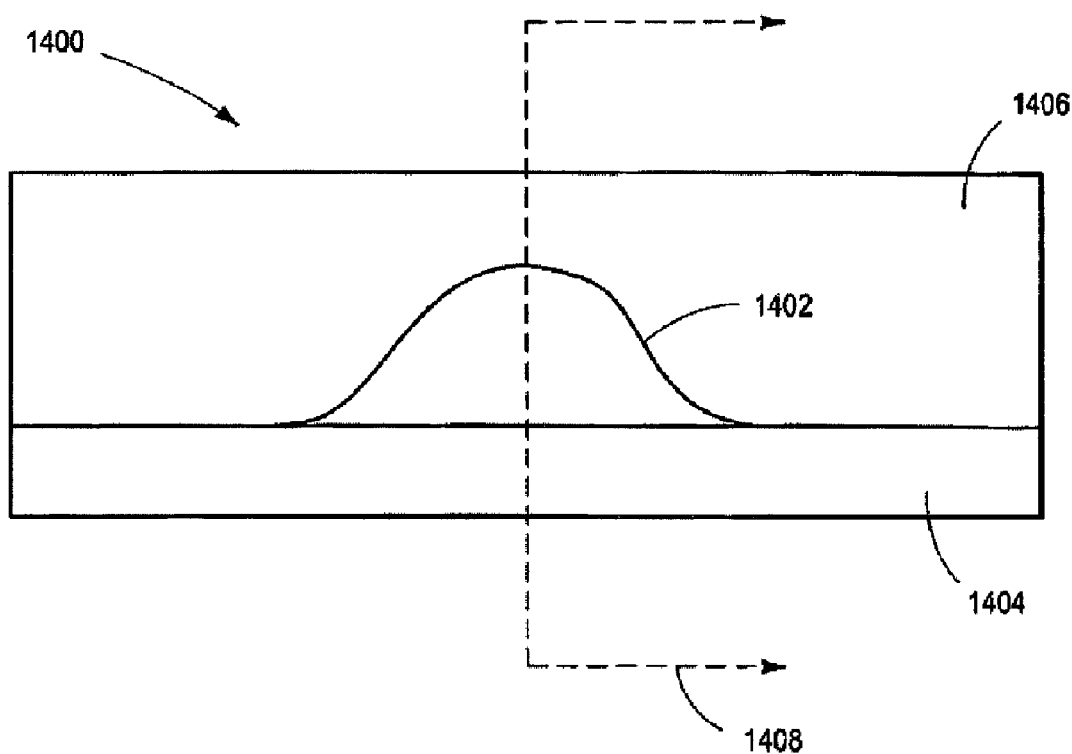
FIG. 14 illustrates a portion of a substrate including electrical connectors in accordance with an exemplary embodiment of the present invention.

As illustrated in FIGS. 9-12, multiple sets of connectors and alignment grooves may be formed from a single sheet of conductive material and encapsulated at one time. In this case, individual optical coupler structures 1300, illustrated in FIG. 13, are formed during step 708 by singulating the couplers from structure 1300. Step 708 may include sawing, cutting, bending, or otherwise separating the individual structures 1300 from one another.

After structures 1300 are separated during step 708, ends of structure 1300, e.g., ends 1302 and 1304 may be polished during step 710 to provide a smooth flat surface of transmission portion 1306.

Finally, ends of the leads 1308 are plated with a material configured to facilitate coupling of the optical coupler to an optoelectronic device during step 712. For example, ends 1308 may be plated with gold or solder to facilitate flip-chip bonding between the coupler and the optoelectronic device and lead ends that attach to the substrate may be coated with gold or solder to facilitate bonding between the coupler and the substrate.

In accordance with another embodiment of the invention, electrical connector and guide formation step 702 includes forming electrical connectors using wire bond technology. In this case, connectors are formed by attaching a wire 1402 (e.g., a wire typically used in wire bonding processing having a diameter of about 2 mils) to a substrate 1404 such as silicon, encapsulating the wire with an encapsulant 1406 such as transfer mold epoxy, and severing structure 1400 along line 1408. After substrate 1400 is formed, transmission medium 1104 and guide sleeves 1102 are attached to substrate 1400 and processing continues as described above.

In accordance with yet another embodiment of the invention, as discussed above in connection with FIGS. 3-5, a microelectronic substrate having conductive interconnections can be used to form an optical coupler. In accordance with one aspect of this embodiment, substrate 302 is formed of a ceramic material such as alumina, having conductive traces and conductive plugs integrating the conductive traces formed therein. In this case, patterned indentations are formed in a top surface of the substrate (e.g., using photoresist patterning and etching techniques while the ceramic is in a green or pre-co-fire state) to form regions to attach sleeves 304 and the optical transmission medium (e.g., fused fibers 308 or fibers 402). Next alignment sleeves 308 and the optical transmission medium would be attached to substrate 302, and the structure may be exposed to an encapsulation process as described above. Then, to facilitate electrical and mechanical coupling of optical coupler 300 to a substrate, solder balls are formed on a bottom surface of structure 300. The solder balls could be formed by, for example, using a controlled collapse chip connect ("C4") solder bump formation process. As a specific example, conductive plugs 306 may be about 50 μm in diameter and about 75 μm in height.

In accordance with yet another embodiment of the invention, structure 300 could be formed using an organic substrate material such as FR4 or Bismaleimide Triazine (BT) epoxy, and patterned and etched using standard microelectronic substrate photolithography or laser-based methods. The remaining portion of fabricating a coupler could then proceed as previously described.

Figure 15:
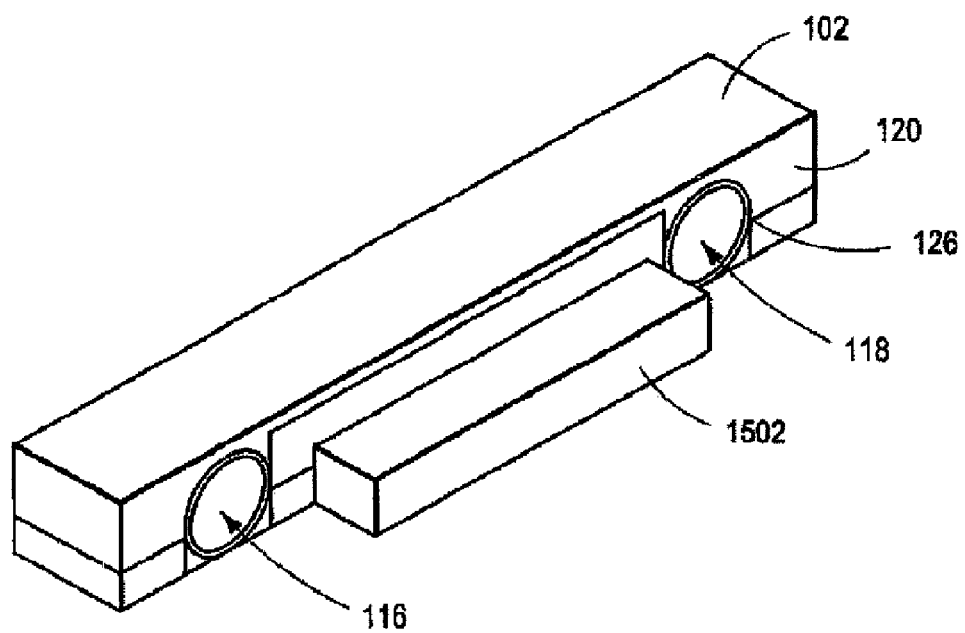
FIGS. 15-16 illustrate steps of forming an optical interconnect system in accordance with the present invention.
Figure 16:
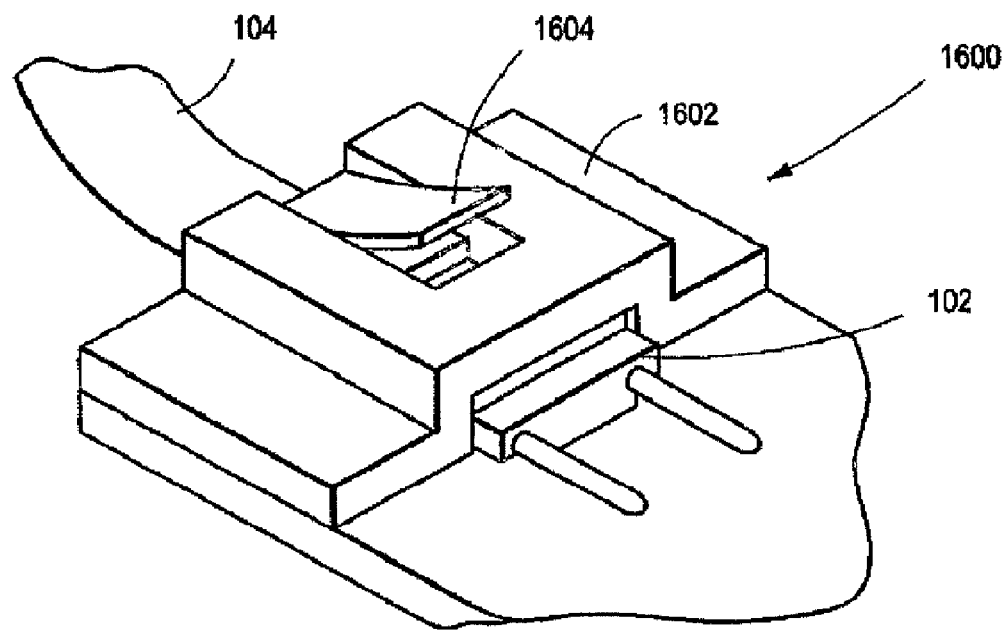

FIGS. 15 and 16 illustrate a process for forming an optical interconnect system in accordance with the present invention. After the coupler is formed, for example, using process 700 as described above, one or more optoelectronic devices is attached to an optical coupler, such as coupler 102. For example, an array of VCSELs, including, but not limited to, 2 to 12 individual VCSELs can be attached to coupler 102 using solder bump, e.g., C4 bonding techniques, a harness, an electrical adhesive, or surface mount technology. Alternately, the VCSELs may be attached to coupler 102, either individually or as an array, using other adhesive materials such as conductive tape, conductive epoxy, or the like.

After the optoelectronic devices are attached to coupler 102, fiber ribbon 104 or another suitable waveguide is attached to coupler 102 by inserting guide pins associated with and attached to ribbon 104 through grooves 116 and 118 to form system 100, illustrated in FIG. 1. As illustrated in FIG. 16, a system 1600 in accordance with the present invention may also include a cap 1602, which allows removable attachment of a fiber ribbon to coupler 102. In the illustrated case, cap 1602 is configured with a tab 1604, which locks in place to secure ribbon 104 to coupler 102. Cap 1602 and tab 1604 may be formed of any suitable material such as injection mold plastic.

While the present invention is set forth herein in the context of the appended drawing figures, it should be appreciated that the invention is not limited to the specific form shown. For example, the optical coupler of the present invention may be scaled to accommodate any number of optoelectronic devices and fibers from a ribbon. Various other modifications, variations, and enhancements in the design and arrangement of the method, apparatus, and system set forth herein, may be made without departing from the spirit and scope of the present invention.

We claim:

1. An optical coupler for coupling an optoelectronic device to an optical fiber, comprising:
   an electrical connector;
   an optical transmission medium disposed proximate the electrical connector, wherein the transmission medium comprises fused fibers; and
   an encapsulant surrounding at least a portion of the connector and at least a portion of the transmission medium.

2. The optical coupler of claim 1, wherein each of the fused fibers has a core diameter smaller than about 50 microns.

3. The optical coupler of claim 1, wherein the electrical connector includes a conductive lead having a first end and a second end, wherein the first end is disposed about ninety degrees from the second end.

4. The optical coupler of claim 1, wherein the encapsulant includes silica-filled epoxy material.

5. The optical coupler of claim 1, further comprising guide grooves configured to receive guide pins attached to fiber ribbon.

6. The optical coupler of claim 1, further comprising a ground plane formed on a lower portion of the coupler.

7. The optical coupler of claim 1, further comprising die attachment material to facilitate bonding of the connector to a substrate.

8. The optical coupler of claim 1, further comprising conductive tape configured to facilitate coupling the connector to an optoelectronic device.

9. The optical coupler of claim 1, wherein the electrical connector includes a conductive plug within a microelectronic device.

10. The optical coupler of claim 9, wherein the electrical connector comprises a plurality of conductive plugs within a microelectronic device.

11. An optical coupler comprising:
    a waveguide, wherein the waveguide comprises a plurality of optical fibers fused together;
    an encapsulant surrounding at least a portion of the waveguide; and
    at least one guide groove formed in the encapsulant, the at least one guide groove configured to receive a pin from a connector attached to a fiber ribbon.

12. The optical coupler of claim 11, further comprising an electrical connector formed at least partially within the encapsulant.

13. Th optical coupler of claim 12, wherein the electrical connector comprises a lead of a leadframe.

14. The optical coupler of claim 12, wherein the connector comprises a wire.

15. The optical coupler of claim 11, wherein the waveguide comprises at least one fiber.

16. The optical coupler of claim 11, wherein at least a portion of the encapsulant comprises a transfer mold compound.

17. The optical coupler of claim 11, wherein at least a portion of the substrate comprises a ceramic material.

18. The optical coupler of claim 11, further comprising a substrate comprising electrical connectors formed as electrical traces and conductive plugs.

19. The optical coupler of claim 11, wherein the guide groove is formed of conductive material.

20. An optical transmission system comprising the optical coupler of claim 11.

21. An optical interconnect system comprising;
    an optical coupler comprising a waveguide, an encapsulant, and an electrical connector formed at least partially within the encapsulant, wherein the waveguide comprises a fused faceplate of a bundle of optical fibers;
    a fiber optic cable attached to the optical coupler; and
    a substrate electrically coupled to the coupler.

22. The optical interconnect system of claim 21, wherein the optical coupler comprises a guide groove and the fiber optic cable comprises a guide pin configured to be received by the guide groove.

23. The optical interconnect system of claim 21, further comprising an optoelectronic device electrically coupled to the optical coupler, such that the optoelectronic device forms an electrical connection to the substrate and an optical connection to a fiber of the fiber optic cable.

24. The optical interconnect system of claim 23, wherein the optoelectronic device comprises a vertical cavity surface emitting laser.

25. The optical interconnect system of claim 24, wherein the vertical cavity surface emitting laser is coupled to the optical coupler using flip-mounting technology.

26. The optical interconnect system of claim 23, wherein the optoelectronic device comprises a photodetector.

27. The optical interconnect system of claim 26, wherein the photodetector is coupled to the optical coupler using flip-chip mounting technology.

28. The optical interconnect system of claim 23, wherein the optoelectronic device comprises a vertical cavity surface emitting laser and the system further comprises a photodetector.

29. The optical interconnect system of claim 28, wherein the vertical cavity surface emitting laser is coupled to the optical coupler using die attach technology and the photodetector is mounted to the optical coupler using die attach technology.

30. The optical interconnect system of claim 23, further comprising solder interposed between the optoelectronic device and the optical coupler.

31. The optical interconnect system of claim 21, wherein the electrical connector comprises a lead portion of a leadframe.

32. The optical interconnect system of claim 21, further comprising a transparent gel attached to a portion of the optical coupler.

33. A method of forming an optical coupler, the method comprising the steps of:
creating electrical connectors;
attaching a waveguide to the electrical connectors, wherein the waveguide comprises a fused faceplate of a bundle of optical fibers; and
encapsulating at least a portion of the electrical connectors and at least a portion of the waveguide.

34. The method of forming an optical coupler of claim 33, further comprising the step of forming guides.

35. The method of forming an optical coupler of claim 34, wherein the step of forming guides comprises bending a portion of a conductive plate to form a conduit.

36. The method of forming an optical coupler of claim 33, wherein the step of creating electrical connectors comprises providing a leadframe and bending the leads.

37. The method of forming an optical coupler of claim 33, wherein the step of creating electrical connectors comprises patterning a surface of a plate of conductive material, etching the plate of conductive material to form conductive leads, and bending the conductive leads.

38. The method of forming an optical coupler of claim 33, further comprising the step of polishing an end of the waveguide.

39. The method of forming an optical coupler of claim 33, further comprising the step of singulating.

40. The method of forming an optical coupler of claim 33, further comprising the step of coating an end of the electrical connectors with a conductive material.

41. The method of forming an optical coupler of claim 40, wherein the step of coating an end comprises attaching a conductive tape to an end.

42. The method of forming an optical coupler of claim 40, wherein the step of coating an end comprises plating conductive material on the end.

43. The method of forming an optical coupler of claim 33, further comprising the step of attaching guide sleeves to a portion of the electrical connectors.

44. The method of forming an optical coupler of claim 33, further comprising the step of forming a ground plane coupled to a portion of the electrical connectors.

45. An optical coupler comprising:
an electrical connector;
a photonics component flip-chip mounted to the electrical connector;
an optical transmission medium comprising fused fibers disposed proximate the electrical connector, the transmission medium comprising relay lens elements and anti-reflection coating;
an encapsulant surrounding at least a portion of the connector and at least a portion of the transmission medium; and
a guide groove formed within the encapsulant.

46. An optical coupler for coupling an optoelectronic device to an optical fiber having a first core diameter, comprising:
an electrical connector;
an optical transmission medium comprising fused optical fibers having a core diameter less than said first core diameter and disposed proximate the electrical connector; and
an encapsulant surrounding at least a portion of the connector and at least a portion of the transmission medium.

47. The optical coupler of claim 46,
wherein each of the fused optical fibers have a core diameter smaller than about 50 microns.

48. An optical coupler comprising:
an electrical connector;
an optical transmission medium comprising fused fibers and juxtaposed with the electrical connector, an optical path of the optical transmission medium being parallel to and coextensive with at least a portion of the electrical connector; and
an optoelectronic device attached to said electrical connector transverse to the optical path and adjacent one end of the optical transmission medium.

49. An optical coupler as in claim 48, wherein the optoelectronic device is a VCSEL.

50. An optical coupler as in claim 48, further comprising:
an optically transparent gel interposed between the optical transmission medium and the optoelectronic device.

51. An optical coupler as in claim 50, wherein said optically transparent gel is index matched to the index of refraction of the transmission medium and to a portion of the optoelectronic device.

52. An optical coupler as in claim 48, further comprising:
an alignment guide disposed longitudinally in parallel with the optical path.

53. An optical coupler comprising:
an electrical connector;
an optical transmission medium comprising fused fibers and attached to the electrical connector, the optical path of the optical transmission medium being parallel to at least a portion of the electrical connector such that a surface portion of said electrical connector and an end surface of the optical transmission medium form a substantially coplanar surface; and
an optoelectronic device attached to the surface portion of said electrical connector and adjacent the optical transmission medium at said coplanar surface.

54. An optical coupler as in claim 53, wherein the optoelectronic device is a VCSEL.

55. An optical coupler as in claim 53, further comprising:
an optically transparent gel interposed between the optical transmission medium and the optoelectronic device.

56. An optical coupler as in claim 55, wherein said optically transparent gel is index matched to the index of refraction of the transmission medium and to a portion of the optoelectronic device.

57. An optical coupler as in claim 53, further comprising:
an alignment guide disposed longitudinally in parallel with the optical path.

58. An optical coupler as in claim 53, wherein the optoelectronic device is a photo detector.

59. An optical coupler as in claim 48, wherein the optoelectronic device is a photo detector.

* * * * *